(12) United States Patent
Song

(10) Patent No.: US 7,111,774 B2
(45) Date of Patent: Sep. 26, 2006

(54) METHOD AND SYSTEM FOR ILLUSTRATING SOUND AND TEXT

(75) Inventor: Jin Song, Dallas, TX (US)

(73) Assignee: PIL, L.L.C., Lincolnwood, IL (US)

( * ) Notice: Subject to any disclaimer, the term of this patent is extended or adjusted under 35 U.S.C. 154(b) by 0 days.

(21) Appl. No.: 10/272,062

(22) Filed: Oct. 16, 2002

(65) Prior Publication Data

US 2003/0116620 A1 Jun. 26, 2003

Related U.S. Application Data

(63) Continuation-in-part of application No. 09/557,644, filed on Apr. 25, 2000.

(60) Provisional application No. 60/147,975, filed on Aug. 9, 1999.

(51) Int. Cl.
*G09B 5/00* (2006.01)

(52) U.S. Cl. .................................... 235/375; 434/317

(58) Field of Classification Search ................ 235/375, 235/383, 449, 435, 439, 440, 450, 493; 434/317, 434/311, 309, 178, 168–169, 308, 319, 330, 434/409; 345/901, 173; 902/19, 27; 178/18.01
See application file for complete search history.

(56) References Cited

U.S. PATENT DOCUMENTS

| | | | |
|---|---|---|---|
| 3,738,021 A * | 6/1973 | Hino et al. ............... | 434/317 |
| 3,808,720 A * | 5/1974 | Smith ....................... | 40/457 |
| 4,021,932 A * | 5/1977 | Lipps ....................... | 434/317 |
| 4,273,538 A | 6/1981 | Ross | |
| 4,355,984 A | 10/1982 | Slavik et al. | |
| 4,425,098 A | 1/1984 | Döring | |
| 4,448,837 A | 5/1984 | Ikeda et al. | |
| 4,636,881 A | 1/1987 | Brefka et al. | |
| 4,703,573 A | 11/1987 | Montgomery et al. | |
| 4,706,536 A | 11/1987 | Sanders | |
| 4,809,246 A | 2/1989 | Jeng | |
| 4,884,974 A * | 12/1989 | DeSmet ..................... | 434/317 |
| 4,900,092 A | 2/1990 | Van Der Westhuizen et al. | |
| 4,913,463 A | 4/1990 | Tlapek et al. | |
| 4,990,092 A * | 2/1991 | Cummings ................ | 434/317 |
| 4,997,374 A | 3/1991 | Simone | |
| 5,088,928 A | 2/1992 | Chan | |
| 5,167,508 A | 12/1992 | McTaggart | |
| 5,174,759 A | 12/1992 | Preston et al. | |

(Continued)

FOREIGN PATENT DOCUMENTS

EP        0 262 616 A1        4/1988

(Continued)

OTHER PUBLICATIONS

Lisa Stifelman, Barry Arons, Chris Schmandt, The Audio Notebook, Paper and Pen Interaction with Structured Speech, MIT Media Laboratory, Mar. 31-Apr. 5, 2001, vol. 3, Issue No. 1, p. 182, Cambridge, MA.

(Continued)

*Primary Examiner*—Karl D. Frech
*Assistant Examiner*—Daniel Walsh
(74) *Attorney, Agent, or Firm*—Lerner, David, Littenberg, Krumholz & Mentlik, LLP

(57) ABSTRACT

A system for displaying audio content with text including a book holder and a book. The book holder identifies which book of a plurality is placed in the holder by detecting magnetic indicators in specific locations and arrangements which are unique to each book. The page of the book which a user views at any given time is identified by detection of ambient light, by detection of a number of circuit elements in parallel, by detection of progressively stacked magnetic sensors, or by microwave reflection.

17 Claims, 15 Drawing Sheets

U.S. PATENT DOCUMENTS

| | | | |
|---|---|---|---|
| 5,191,329 A | 3/1993 | Samreus | |
| 5,209,665 A | 5/1993 | Billings et al. | |
| 5,226,822 A | 7/1993 | Morris | |
| 5,263,865 A | 11/1993 | Zipf | |
| 5,290,190 A | 3/1994 | McClanahan | |
| 5,356,296 A | 10/1994 | Pierce et al. | |
| 5,368,488 A * | 11/1994 | Gentile | 434/317 |
| 5,374,195 A | 12/1994 | McClanahan | |
| 5,407,357 A | 4/1995 | Cutler | |
| 5,413,486 A | 5/1995 | Burrows et al. | |
| 5,417,575 A | 5/1995 | McTaggart | |
| 5,419,705 A | 5/1995 | Sandvik | |
| 5,437,552 A | 8/1995 | Baer et al. | |
| 5,453,013 A | 9/1995 | Billings et al. | |
| 5,466,158 A * | 11/1995 | Smith, III | 434/317 |
| 5,477,510 A | 12/1995 | Ukita | |
| 5,484,292 A | 1/1996 | McTaggart | |
| 5,485,176 A | 1/1996 | Ohara et al. | |
| 5,511,980 A | 4/1996 | Wood | |
| 5,517,407 A | 5/1996 | Weiner | |
| 5,520,544 A | 5/1996 | Manico et al. | |
| 5,531,600 A * | 7/1996 | Baer et al. | 434/317 |
| 5,534,888 A | 7/1996 | Lebby et al. | |
| 5,558,520 A | 9/1996 | Werzberger | |
| 5,567,163 A | 10/1996 | Ku | |
| 5,575,659 A | 11/1996 | King et al. | |
| 5,604,517 A | 2/1997 | Filo | |
| 5,609,488 A | 3/1997 | McTaggart | |
| 5,631,883 A | 5/1997 | Li | |
| 5,636,995 A | 6/1997 | Sharpe, III et al. | |
| 5,645,432 A * | 7/1997 | Jessop | 434/322 |
| 5,686,705 A | 11/1997 | Conroy et al. | |
| 5,697,793 A | 12/1997 | Huffman et al. | |
| 5,707,240 A * | 1/1998 | Haas et al. | 434/317 |
| 5,739,814 A | 4/1998 | Ohara et al. | |
| 5,761,485 A | 6/1998 | Munyan | |
| 5,795,213 A | 8/1998 | Goodwin | |
| 5,803,748 A | 9/1998 | Maddrell et al. | |
| 5,807,176 A | 9/1998 | Forsse et al. | |
| 5,810,604 A | 9/1998 | Kopp et al. | |
| 5,829,985 A | 11/1998 | Campanella | |
| 5,851,119 A | 12/1998 | Sharpe, III et al. | |
| 5,877,458 A | 3/1999 | Flowers | |
| 5,888,070 A * | 3/1999 | La Tour et al. | 434/156 |
| 5,897,324 A | 4/1999 | Tan | |
| 5,954,514 A * | 9/1999 | Haas et al. | 434/317 |
| 5,991,085 A | 11/1999 | Rallison et al. | |
| 6,021,306 A | 2/2000 | McTaggart | |
| 6,041,025 A | 3/2000 | Ohga et al. | |
| 6,041,215 A * | 3/2000 | Maddrell et al. | 434/317 |
| 6,064,855 A * | 5/2000 | Ho | 434/317 |
| 6,164,534 A | 12/2000 | Rathus et al. | |
| 6,167,233 A | 12/2000 | Gresser, Jr. et al. | |
| 6,201,947 B1 | 3/2001 | Hur et al. | |
| 6,229,502 B1 | 5/2001 | Schwab | |
| 6,262,662 B1 * | 7/2001 | Back et al. | 340/572.1 |
| 6,297,812 B1 | 10/2001 | Ohara et al. | |
| 6,313,828 B1 | 11/2001 | Chombo | |
| 6,314,474 B1 | 11/2001 | Walter et al. | |
| 6,330,427 B1 | 12/2001 | Tabachnik | |
| 6,331,867 B1 | 12/2001 | Eberhard et al. | |
| 6,416,326 B1 | 7/2002 | Oh | |
| 6,421,524 B1 * | 7/2002 | Padgett | 434/317 |
| RE37,929 E | 12/2002 | Fernandez | |
| 6,513,836 B1 | 2/2003 | Li | |
| 6,655,586 B1 | 12/2003 | Back et al. | |
| 6,729,543 B1 * | 5/2004 | Arons et al. | 235/462.13 |
| 6,763,995 B1 | 7/2004 | Song | |
| 6,788,283 B1 | 9/2004 | Blotky et al. | |
| 2001/0051329 A1 | 12/2001 | Lynch et al. | |
| 2002/0081560 A1 | 6/2002 | Ka-Wah et al. | |
| 2003/0152293 A1 | 8/2003 | Bresler et al. | |
| 2003/0162475 A1* | 8/2003 | Pratte et al. | 446/175 |
| 2003/0170604 A1 | 9/2003 | Mullen | |
| 2003/0175672 A1* | 9/2003 | Kim et al. | 434/317 |
| 2004/0016809 A1 | 1/2004 | Song | |
| 2004/0023200 A1* | 2/2004 | Blume | 434/317 |
| 2004/0043365 A1* | 3/2004 | Kelley et al. | 434/178 |
| 2004/0213140 A1* | 10/2004 | Taylor et al. | 369/292 |
| 2005/0053906 A1* | 3/2005 | Kim et al. | 434/317 |

FOREIGN PATENT DOCUMENTS

| | | |
|---|---|---|
| EP | 0 609 048 | 3/1994 |
| EP | 0 702 366 A2 | 3/1996 |
| GB | 2306754 A * | 5/1997 |
| JP | 56-32293 | 4/1981 |
| JP | 57-147767 A1 | 9/1982 |
| JP | 61-6797 | 2/1986 |
| JP | 62-181979 | 11/1987 |
| JP | 63-76873 | 5/1988 |
| JP | 63-96898 | 6/1988 |
| JP | 1-118456 | 8/1989 |
| JP | 2-1962 | 1/1990 |
| JP | 2-13037 | 4/1990 |
| WO | WO-00/11634 A1 | 3/2000 |

OTHER PUBLICATIONS

Lisa J. Stifelman, Augmenting Real-World Objects: A Paper-Based Audio Notebook, MIT Media Laboratory, Jan. 5, 2006, www.media.mitedu/speech/people/lisa/chi96.html, Cambridge, MA.

* cited by examiner

| PAGE | SENSOR STATE | | | | | | | | | |
|---|---|---|---|---|---|---|---|---|---|---|
| 1PAGE | L | H | H | H | H | H | H | H | H | H |
| 2PAGE | L | L | H | H | H | H | H | H | H | H |
| 3PAGE | L | L | L | H | H | H | H | H | H | H |
| 4PAGE | L | L | L | L | H | H | H | H | H | H |
| 5PAGE | L | L | L | L | L | H | H | H | H | H |
| 6PAGE | L | L | L | L | L | L | H | H | H | H |
| 7PAGE | L | L | L | L | L | L | L | H | H | H |
| 8PAGE | L | L | L | L | L | L | L | L | H | H |
| 9PAGE | L | L | L | L | L | L | L | L | L | H |
| ⋮ | ⋮ | ⋮ | ⋮ | ⋮ | ⋮ | ⋮ | ⋮ | ⋮ | ⋮ | ⋮ |
| n-1PAGE | L | L | L | L | L | L | L | L | L | H |

L - LOW
H - HIGH

METHOD AND SYSTEM FOR ILLUSTRATING SOUND AND TEXT

CROSS REFERENCE TO RELATED APPLICATION

The application is a continuation-in-part of non-provisional U.S. patent application Ser. No. 09/557,644 filed Apr. 25, 2000 entitled "Method and System for Illustrating Sound and Text," the entirety of which is incorporated herein by reference. This application claims the benefit of 60/147,975 filed Aug. 9, 1999 on the aforementioned related non-provisional application.

BACKGROUND OF THE INVENTION

1. Technical Field

The present invention relates generally to a method and system for illustrating sound and text. More particularly, the present invention relates to a method for illustrating sound and text utilizing a book holder adapted to accept a book with pages including illustrations and/or text.

2. Description of Related Art

Without limiting the scope of the invention, its background is described in connection with electronic book reader systems. Substantial interest has long been given by the public to books which include sound illustration related to the text and/or illustration content within the book. Such sound illustrated books range in the industry from children's storybooks to manuals for learning a foreign language. Their popularity stems from the fact that a user can visually follow the text and/or illustration content in the book while listening to the audible representations corresponding to the text and/or illustration content.

Many sound illustrated books include a book and an audiocassette tape. The book, however, only has text and/or illustrations. It is the cassette tape that contains pre-recorded audio representations (e.g., voice and/or sound) which correspond with the text and/or illustrations on the pages of the book. In operation, the reader must follow the rhythm of the cassette. When the reader reaches a point for turning the page, a sound or voice instruction is heard indicating such action. If, however, the reader is not following attentively, the audio cassette will continue delivering audio, representations until stopped manually, or until the cassette reaches its end. As such, the reader may find him/herself on the wrong page.

Another sound illustrated book system includes a book holder with a stylus, wherein the stylus is used to prompt the holder to display audio depending on what the user presses with the stylus. For example, detectors are placed on the back of a book holder so that when a user selects a given image in the book, the holder (which must know what page the user is on) is able to display audio content associated with the particular image or word indicated with the stylus. Such systems typically include a particular target which must be depressed by the stylus in order to alert the system that the page has been turned. This system is depicted in FIGS. 1 and 2.

FIG. 1 shows a prior art system which uses a stylus. The system 100 includes a book holder 102 and book 104 which is placed in the holder 102. Stylus 106 is used to depress selected objects 108, 110, 112 which are detected by electronics in the holder 102. To accomplish this, the holder is equipped with sensors so that audio content associated with, for example, square 110 is displayed when square 110 is depressed with a stylus. This requires that the system know what page the book is on. Go button 108 is depressed by the user with the stylus when the page is turned, so that the system knows what page is displayed before the user. FIG. 2 shows the same system after the page has been turned. Dashed lines represent objects on the previous page, beneath the current page. 110 is the square, not behind the current page, as is triangle 112. On the current page circle 210 and diamond 212 are shown. The previous page's go button 108 is noticeably in a different location than the current page's go button 208. This arrangement allows the user to press go button 208 once the page has been turned, so that audio content associated with circle 210 and diamond 212 will be displayed when the stylus 106 selects those areas.

This system includes some limitations. For example, if a young user forgets to press the go button 208 after turning the page, then the holder will still display audio content associated with the previous page. In that case, when the user selects circle 210 the audio content associated with square 110 is liable to be displayed. Similarly, if the user accidentally selects the wrong position with the stylus on the left hand column where the go buttons 108, 208 are located, the system may mistake what page is currently being viewed. Children, who are among the target consumers for such book reading devices, may be prone to misapply the stylus, causing this system to mistakenly display audio content unassociated with the actual page which the child is viewing.

Other sound illustrated books enjoyed by the public today include pages comprising a pre-recorded sound chip which includes stored data (e.g., voice and sound). A problem with this type of sound illustrated book is that sound chips generally have a limited amount of memory storage capability. In addition, these chips are directly attached to each page. This can add significantly to the overall weight and girth of the page, or require the use of thick, almost cardboard-like, paper stock. U.S. Pat. No. 6,064,855 describes a system similar to this.

FIG. 3 depicts such a system. The pages 302 are thick enough to contain an integrated circuit or chip 304 attached thereto or placed between layers of the pages 302. Such books are more expensive to manufacture than books without individual chips on each page.

Another common problem is limitation to stored content within the system. For example, many book reading systems include cassettes for each book to be read, the cassette being inserted into the system when the book is read. Such systems typically require a new cassette for each book to be read. While the cassettes are not usually difficult to work with, children are less able to manipulate such devices than are adults, and the art would be improved by reducing the need to switch cassettes for each new book.

SUMMARY OF THE INVENTION

The present invention provides for an electronic book reader system. The innovative system preferably includes a book holder, a book, and a cassette which contains audio information related to the text of the book—preferably a reading of that text. Audio cassettes can include text for a plurality of books, which raises a need for the ability to distinguish different books. This is achieved, in one embodiment, by placement of magnetic indicators or signatures at specified locations in the book. The holder is capable of detecting the magnetic signatures. One possible implementation of this innovative approach is described as providing three locations on a book dedicated to book identification. The presence of a magnetic signature indicates a first state, the absence of the signature indicates a second state. A binary code is then assigned for each book, so that the arrangement of the magnetic signatures uniquely identifies books. This allows for a single cassette to contain audio associated with a plurality of books.

The present invention also provides innovative ways for detecting the page which a user of the innovative audio book system currently views. In a first embodiment, each page of the book has a reference hole and a progressive hole. The reference hole is the same size for all pages, while the progressive holes are different size on each page. The holes on the respective pages are aligned so that the reference holes are all stacked and the progressive holes are all stacked. As pages are turned, the amount of light passing through the collected reference holes will remain relatively constant, while the amount of light passing though the progressive holes increases with each page—and as the smallest of the progressive holes increases in size. (This requires that the top most page have the smallest progressive hole, the holes getting larger as the pages are turned). Photo detectors placed at the proper location (beneath the reference and progressive holes) can detect changes in relative intensity of the light passing through the collected holes. The book holder system uses this information to determine what page the user is viewing, and hence what audio to display.

Another innovative method for detecting the page includes the use of circuit elements in parallel. In one example embodiment, resistors are placed on each page by any of various methods. The resistors and conductive material are so arranged that when the pages are closed, atop one another, they form a circuit wherein a resistor on each individual page is in parallel with all the resistors, one from each closed page. As a page is opened, that resistor is removed from the parallel circuit. The holder system detects the total resistance of the closed pages, and thereby detects what page the user is currently viewing. This embodiment need not implement resistors, and a number of potential circuit elements and arrangements are described, including parallel capacitors and inductors.

Another innovative embodiment includes page detection by means of accumulating magnetic field strength on each page. Each page is equipped with some sort of magnetic field signature, positioned so that as the pages are stacked (e.g., closed), their magnetic field strengths accumulate in a distinguishable way. The holder system is equipped with Hall effect sensors or similar technology so that the page currently being viewed is detectable by reference to the total accumulated magnetic field strength.

Another innovative embodiment includes page detection by means of reflected microwave radiation. The holder is equipped with a microwave transceiver. Each page is equipped with a metal structure (for example) so that as pages are stacked, an antenna is formed. The size and reflectivity of the antenna depends on how many pages are closed. Therefore, the holder system can detect what page is currently being viewed by measuring the amount of microwave radiation reflected by the closed pages.

These and other innovations are explained more fully in the description which follows.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE INVENTION

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated. While the making and using of various embodiments of the present invention are discussed in detail below, it should be appreciated that the present invention provides many applicable inventive concepts which can be embodied in a wide variety of specific contexts. The specific embodiments discussed herein are merely illustrative of specific ways to make and use the invention, and do not delimit the scope of the invention.

Figure 1:
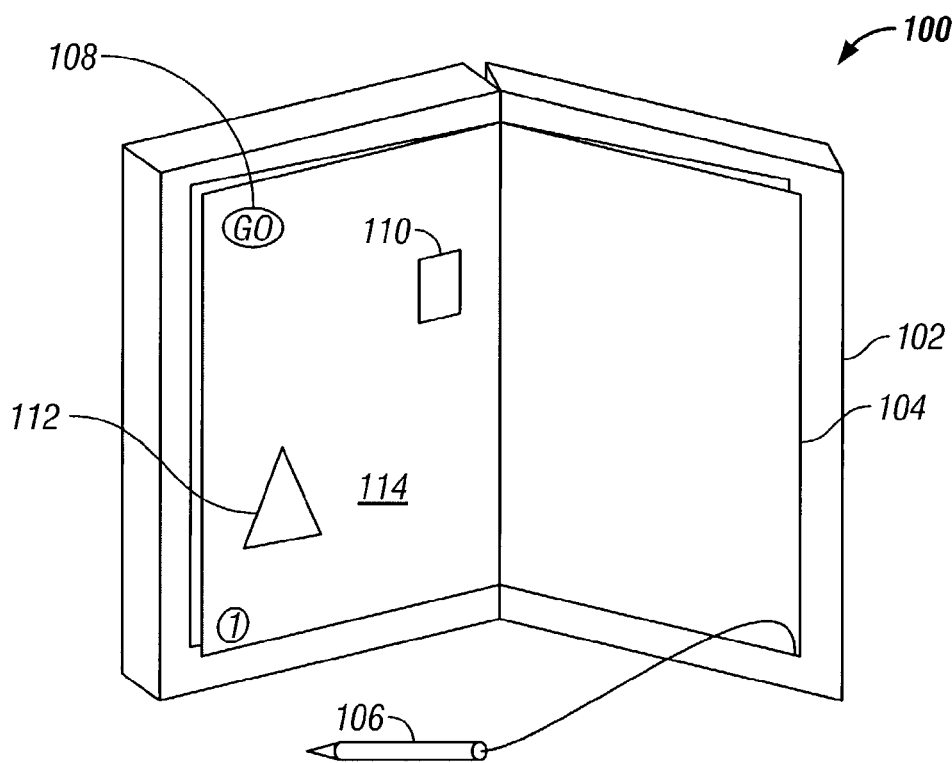
FIG. 1 shows a prior art book reading system.
Figure 2:
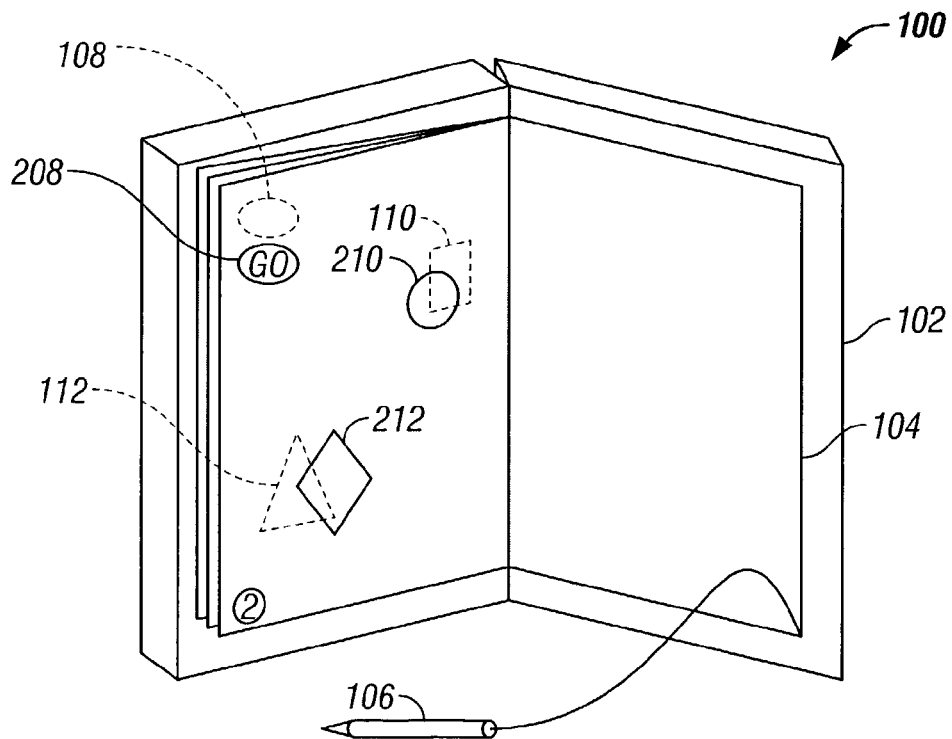
FIG. 2 shows a prior art book reading system in a different position.
Figure 3:
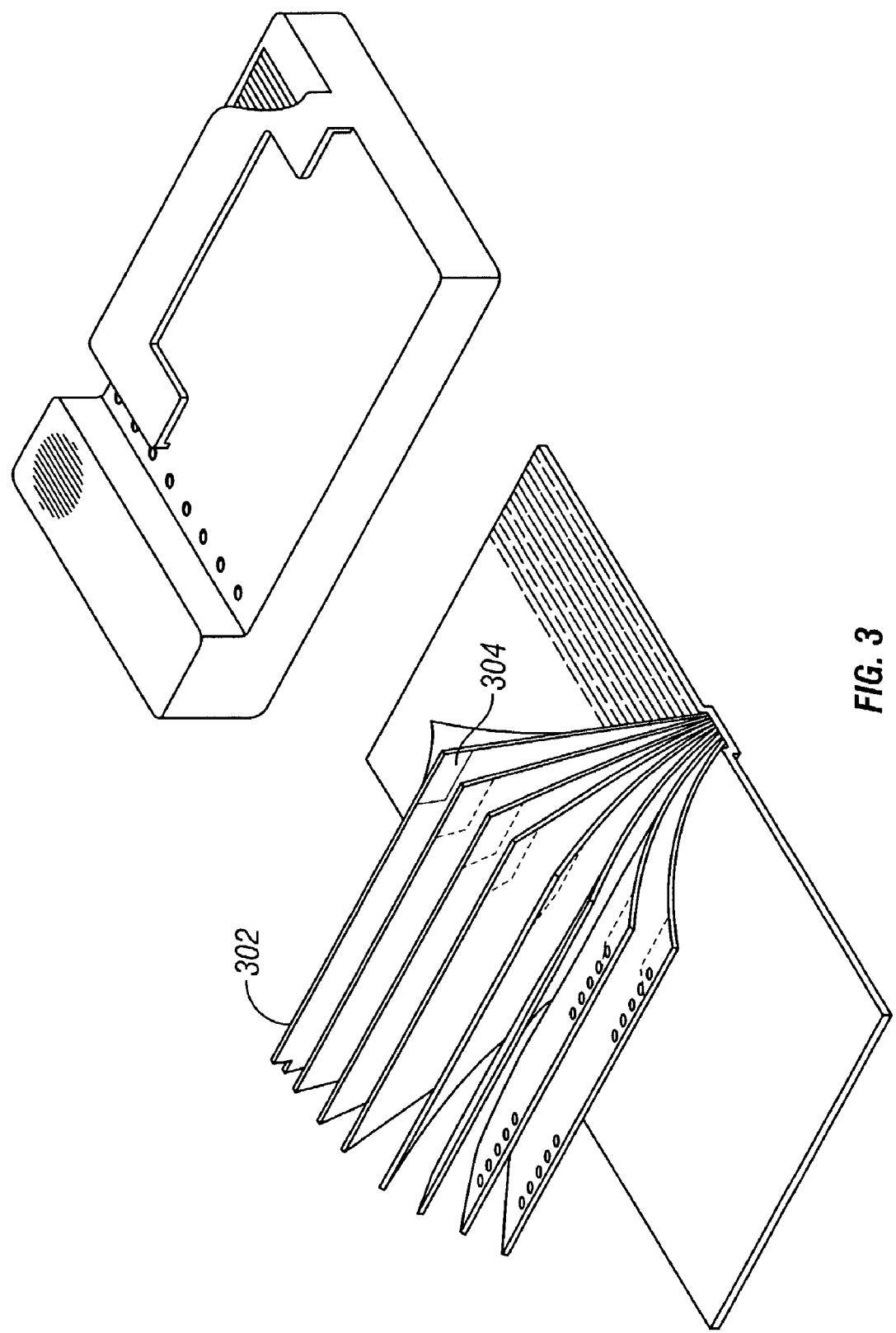
FIG. 3 shows a prior art book reading system which uses integrated circuits attached to each page.
Figure 4:
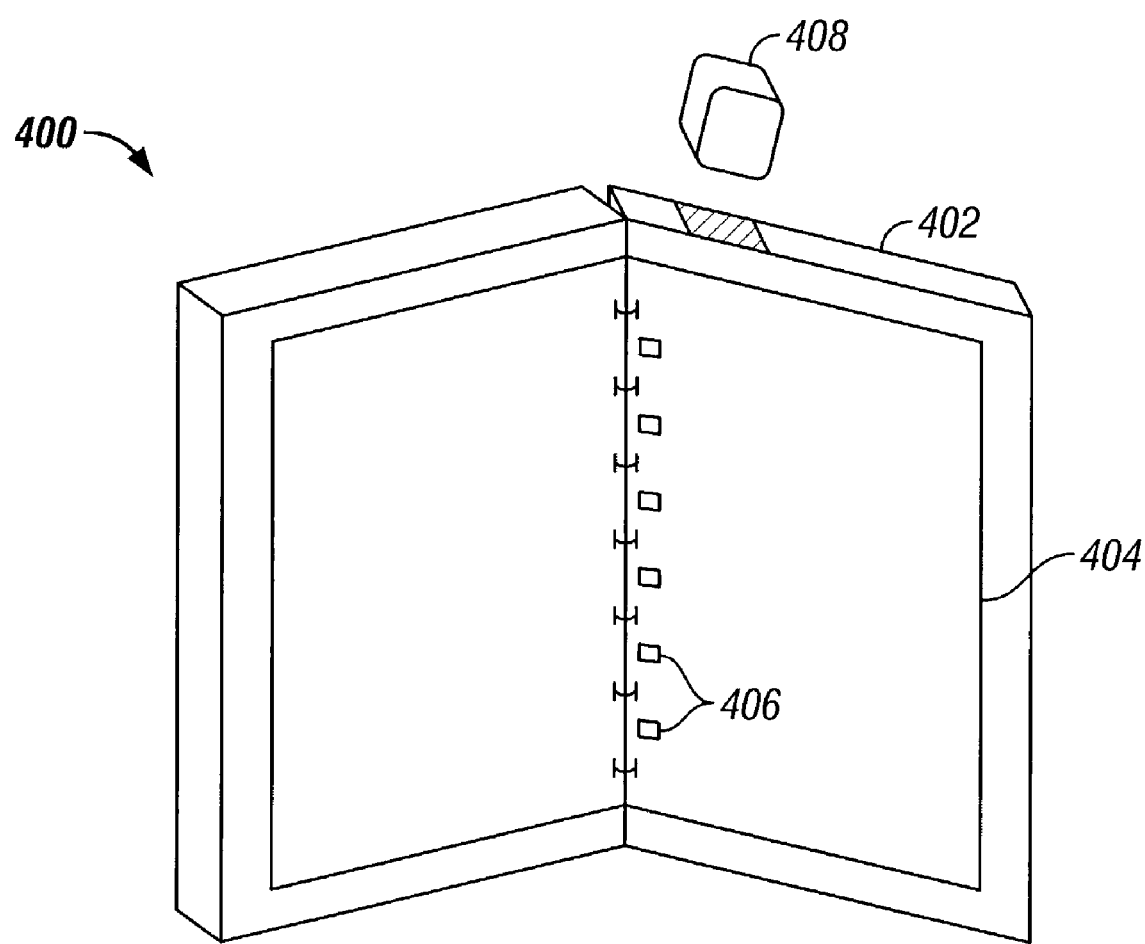
FIG. 4 shows the innovative system according to a preferred embodiment.

FIG. 4 shows the innovative electronic book reader system for illustrating sound and text consistent with a preferred embodiment. The system 400 includes a book holder 402 which is capable of receiving a book 404 therein. In preferred embodiments, the book 404 is made to affix within the book holder 402 and is spiral bound. Also in preferred embodiments, the binder includes positions 406 that are designed to receive some sort of page detection mechanism. The holder 402 includes a slot for receiving a cartridge or cassette 408 that includes audio content for display with the book 404.

In a preferred embodiment, the cassette 408 is inserted into the holder 402 as is the book 404. The book holder 402 detects which book has been placed therein (described more fully below) and when the book is opened, the holder displays audio associated with that page or "open position" of the book. As pages of the book are turned, the system detects what page is open to the reader, and displays audio associated with that page. The system for identifying the page is described more fully below.

In a preferred embodiment, cassette 408 includes audio content associated with more than one book. Such a capability requires that the system be able to identify which book is placed in the book holder as well as identify the page that particular book is on at a given moment.

Figure 5A:
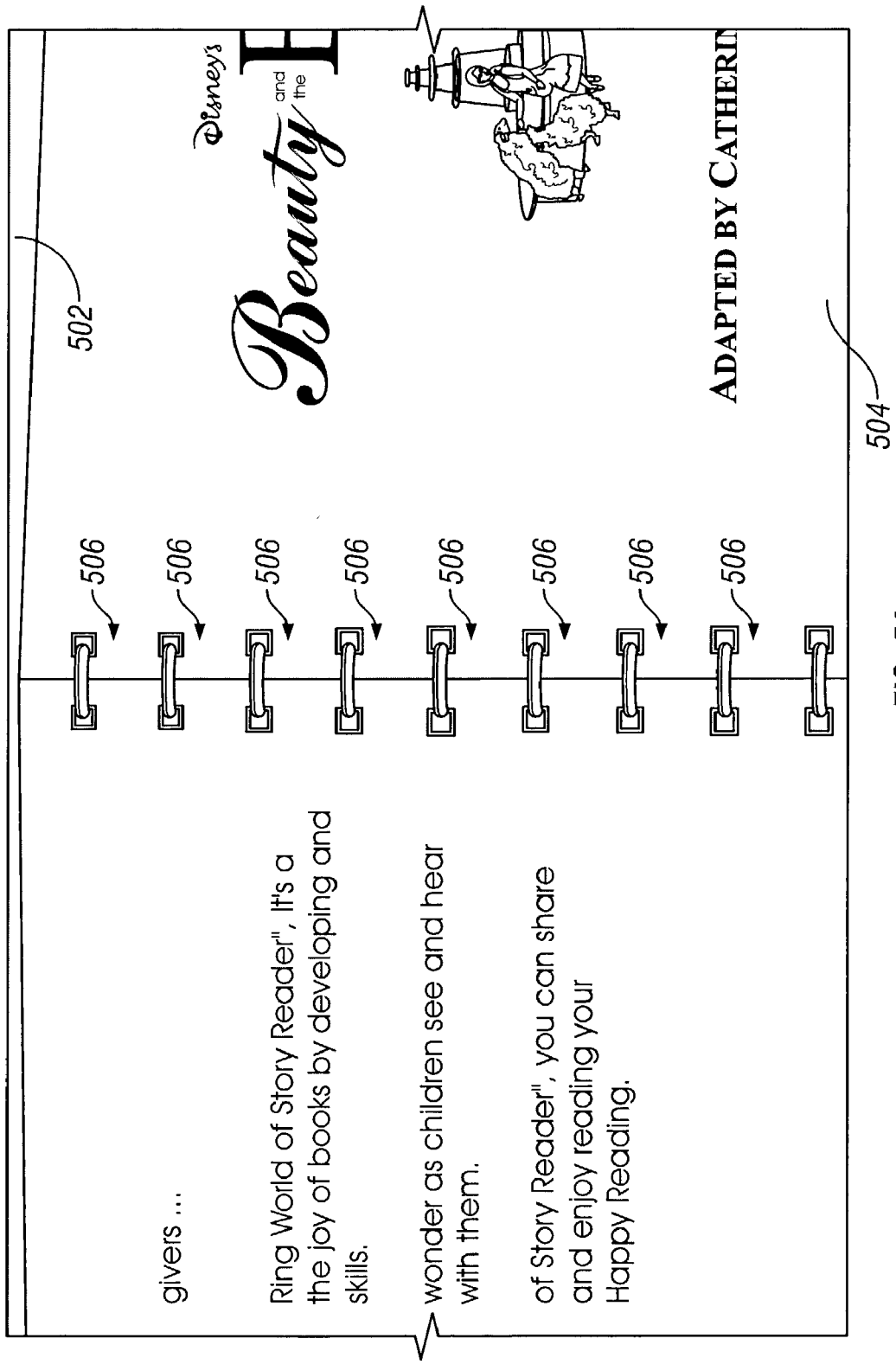
FIG. 5A shows a detail of the innovative system, according to a preferred embodiment.
Figure 5B:
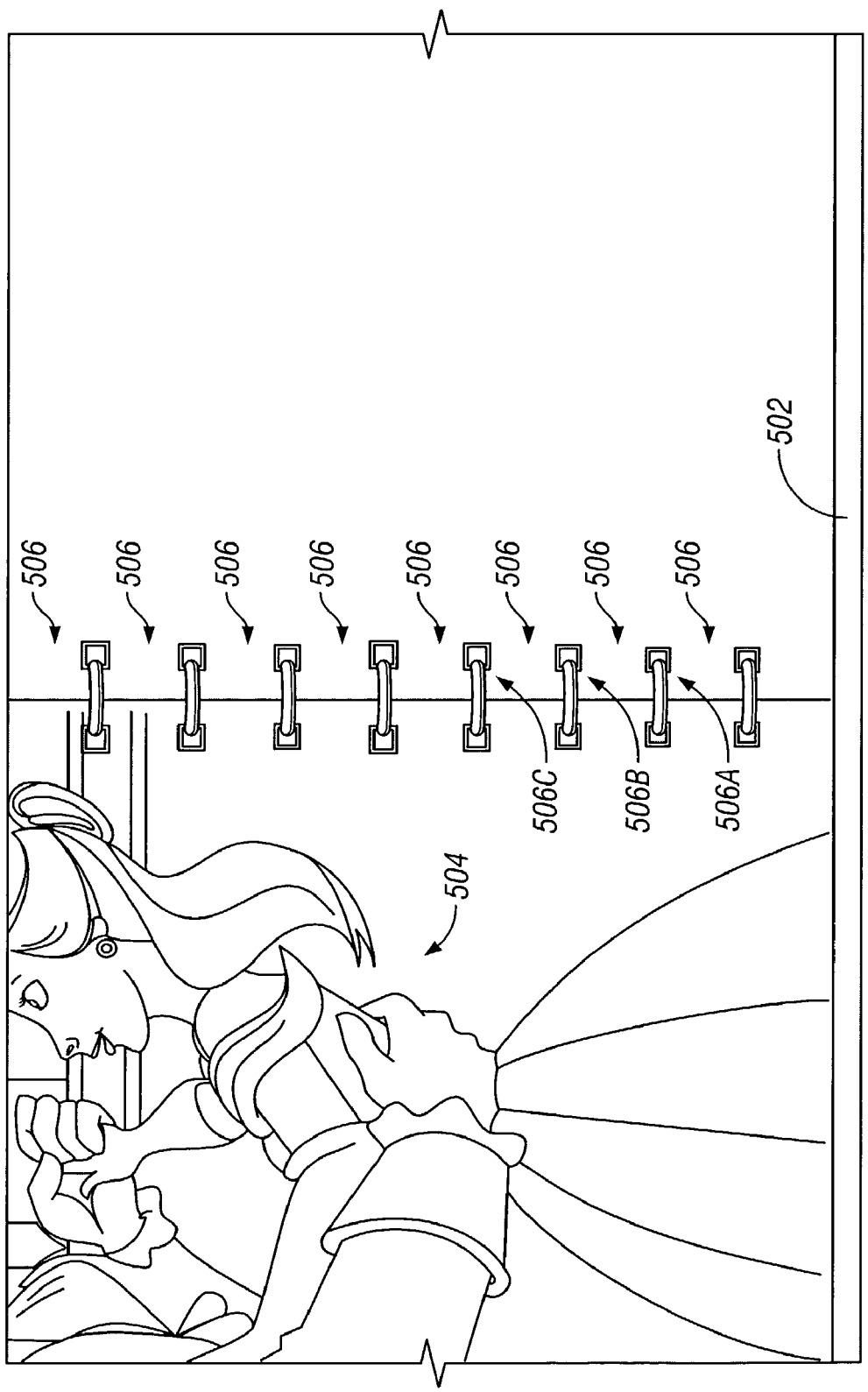
FIG. 5B shows a detail of the innovative system, according to a preferred embodiment.

FIGS. 5A and 5B show more detailed views of the book and holder of the present system. In FIG. 5A, the book 504 is bound with spiral wire through holes in the book. Between the holes described by the binding are positions 506 at which are placed, in one embodiment, magnetic signatures or another means for detecting the page to which the book is open. Holder 502 is also shown. (It should be noted that the particular form of binding is not intended to limit the invention, and spiral binding is only an example.)

FIG. 5B shows the same system but focuses on the bottom of the binding. Positions 506 are shown. In one preferred embodiment, the innovative system detects which book 504 is placed in the holder 502 by noting the placement or absence of indicators (e.g., magnetic signatures) at specific positions 506. For example, on one embodiment, the bottom three positions 506A, 506B, 506C are dedicated to identifying the book. In this embodiment, there are enough positions 506 so that every set of open pages of the book 504 corresponds to a position, with three positions 506A–C left over. In other words, if there are ten open positions of pages of the book in this embodiment (i.e., the book has ten open positions), then thirteen magnetic signatures at positions 506 are required.

The first (top) ten positions 506 are used to determine what pages are open to the reader, while the bottom three 506A–C are used to identify the book itself. This is accomplished by associating a particular book with a particular binary code represented in the bottom three positions 506A–C. For example, a first book is associated with the binary code "001" which is represented on the book itself by placing a magnetic signature (or other identifying apparatus, described below) at the 506C position, while leaving the 506A, 506B positions open. Hence, the absence of a signature represents a binary "0" while the presence of a signature represents a binary "1". In this way, a plurality of books can be uniquely identified by the positioning of signatures at the bottom three positions. Three positions dedicated to identification of the book can uniquely identify 8 books. Binary coding is preferred for this system, but other codes could be used according to the kind of signatures used.

In a preferred embodiment, the cassette 408 includes audio content associated with a plurality of books. The cassette also contains information so that when a book 504 is placed in the holder 502, the system 400 can identify the book 504 by reading the bottom three positions 506A–C for signatures. This is, in a preferred embodiment, accomplished by sensors that detect the presence or absence of a signature at the positions 506. The sensors are preferably hidden within the holder 502 and positioned near where the book binding lies when the book 504 is within the holder 502. This and other page detection systems consistent with preferred embodiments are described more fully below.

If three positions 506A–C are reserved for book identification, and if binary coding is used, then up to eight unique book identities can be recognized. Hence, a single cassette 408 can contain audio content for eight unique books. This allows a book to be removed and another book placed in the holder without the need to replace the cassette 408 as well. When a new book 504 is placed in the holder 502, the system 400 reads the bottom three positions 506A–C and identifies the book. It is then capable of displaying the correct audio content associated with that book. More or fewer positions may of course be dedicated to the identification of books. And though the book identification aspect of the present invention has been described with reference to magnetic signatures, other detection schemes may also be implemented consistent with preferred embodiments.

Figure 6:
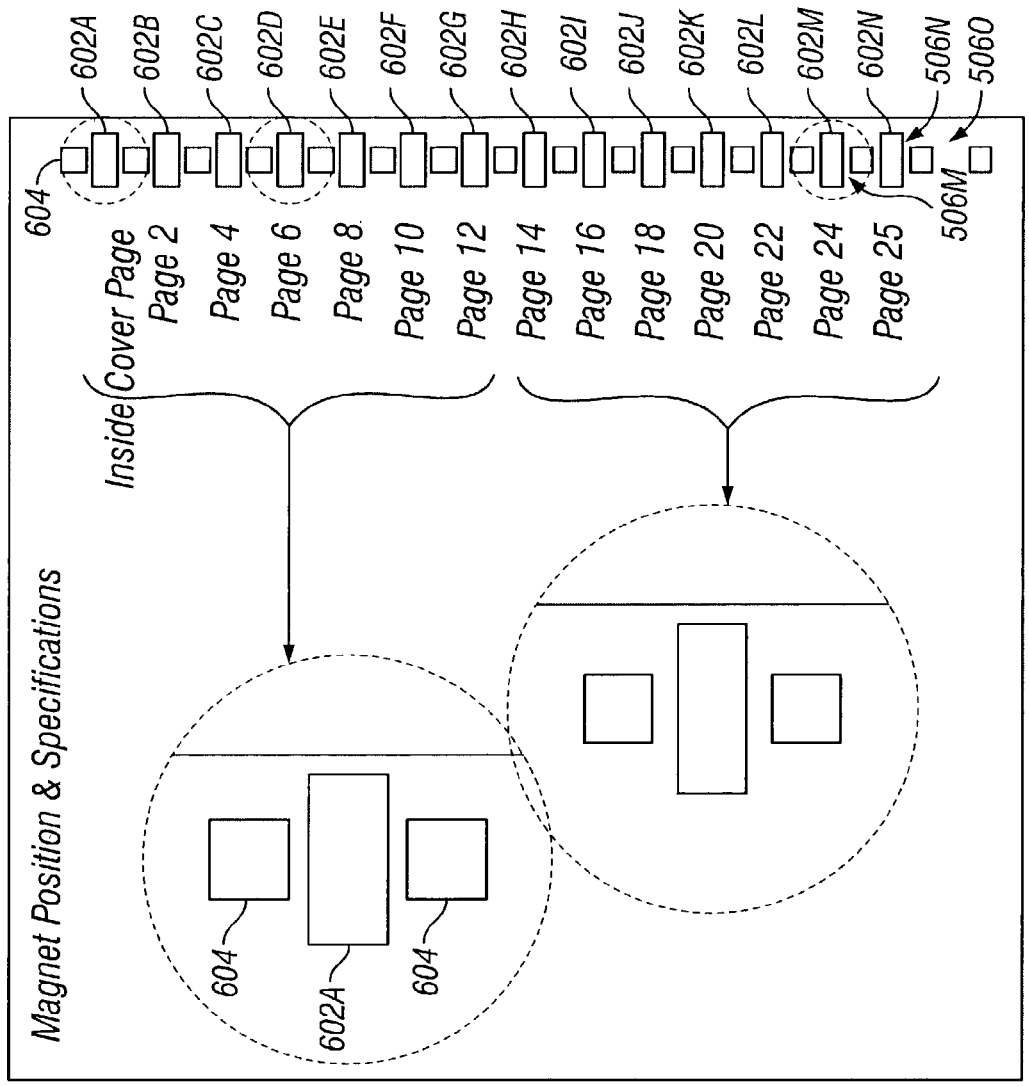
FIG. 6 shows a diagram of magnetic signature placement, according to a preferred embodiment.

FIG. 6 shows a schematic of the positions and dimensions of the page bindings and magnetic signatures in an example embodiment. This example shows the association of magnets 602A–N with pages in the book. Note that only the open positions of the book need be identified, so in practice every other "page" must be represented by a magnetic signature at a position. In a preferred embodiment, the placement of magnetic signatures 602A–N corresponds to the positions 506 from FIG. 5. Two potential arrangements are detailed, with different dimensions given. The specific implementation of the signatures is not intended to limit the scope of the invention, and the dimensions are only offered as an example.

In this figure, it is noted that the bottom three positions 506M, 506N, 506O are preferably used for book identification. In this case, the binary representation would be "110" since the positions 506M, N have magnetic signatures 602M, N placed there, while position 506O has no magnet.

Though book identification has been described as dedicating the bottom three positions 506 to book IDs, books may be identified by dedicating any particular set of positions 506 to the book identification process. Also, though the positions are shown as being spaced between the holds of the spiral binding, any arrangement of signatures suffices, whether on the binding or outer edge of the book. Furthermore, the positions 506 dedicated to book identification need not be contiguous.

The present invention now describes page detection innovations consistent with a preferred embodiment.

Figures 7, 8:
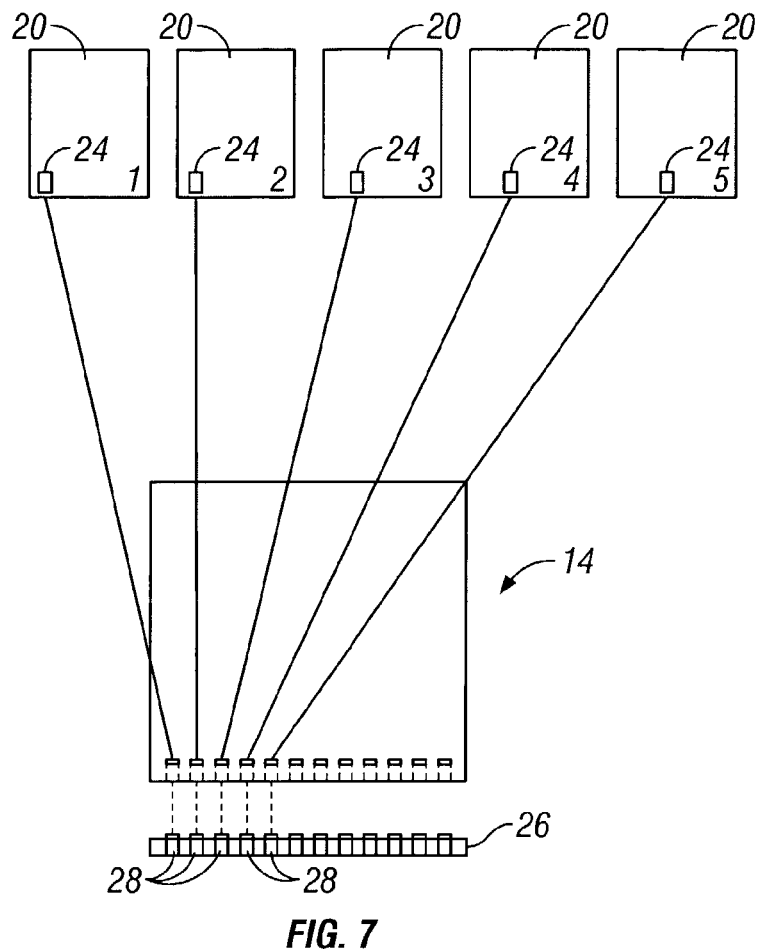
FIG. 7 shows the detection of magnetic signatures according to a preferred embodiment.
FIG. 8 shows the page detection scheme according to a preferred embodiment.

In a first embodiment, page detection is described with reference to a magnetic detection system. With reference to FIG. 7, therein is shown the relationship between the magnetic signatures 24 and the magnetic signature sensor 26. In one embodiment, a book may include five (5) pages 20, each containing illustrations and/or text therein. Therefore, each of the five (5) pages 20 will include a magnetic signature 24 which is attached at a specified location on each of page 20.

The magnetic signatures 24 are small in size and will not require the page, or pages 20 to be significantly altered.

The reading surface 14 of the system comprises a magnetic signature sensor 26 which includes one or more individualized reading elements 28. In one embodiment, only five (5) of the reading elements 28 will be used. The reading elements 28 are pre-aligned on the reading surface 14 in order to correspond with the magnetic signatures 24 at their specified locations on each of the pages 20. A user will then place the book containing five (5) of pages 20 on the reading surface 14.

As the user views the illustrations and/or text on Page 1, the magnetic signature 24 on Page 1 will be detected by the reading element 28 of the magnetic signature sensor 26 corresponding to the magnetic signature 24 on Page 1. As the magnetic signature 24 of Page 1 comes into contact with the corresponding reading element 28, a Low (L) voltage signal will be depicted as shown in FIG. 8. The other magnetic signatures 24 will remain in a High (H) state until detected. Such signal from the corresponding sensor will then communicate with logic contained within the reading controller. It is the logic which enables the reading controller to retrieve the electronic equivalent representations corresponding to the text and/or illustrations on Page 1 and deliver them to a speaker.

This sequence will then continue with the user turning to Page 2, which includes illustrations, and/or text. As shown in FIG. 8, while the user is viewing Page 2, two Low (L) voltages will be detected. This will, however, indicate that the user is on Page 2, and thus, retrieve the associated audio content for delivery in an audible manner to the user. Only the electronic equivalent representations corresponding to the text and/or illustrations on Page 2 will be delivered to the user. No additional sound will be heard until the user decides to turn to Page 3. As such, the user can control the speed of his/her reading of the book for enjoyment purposes.

Figure 9:
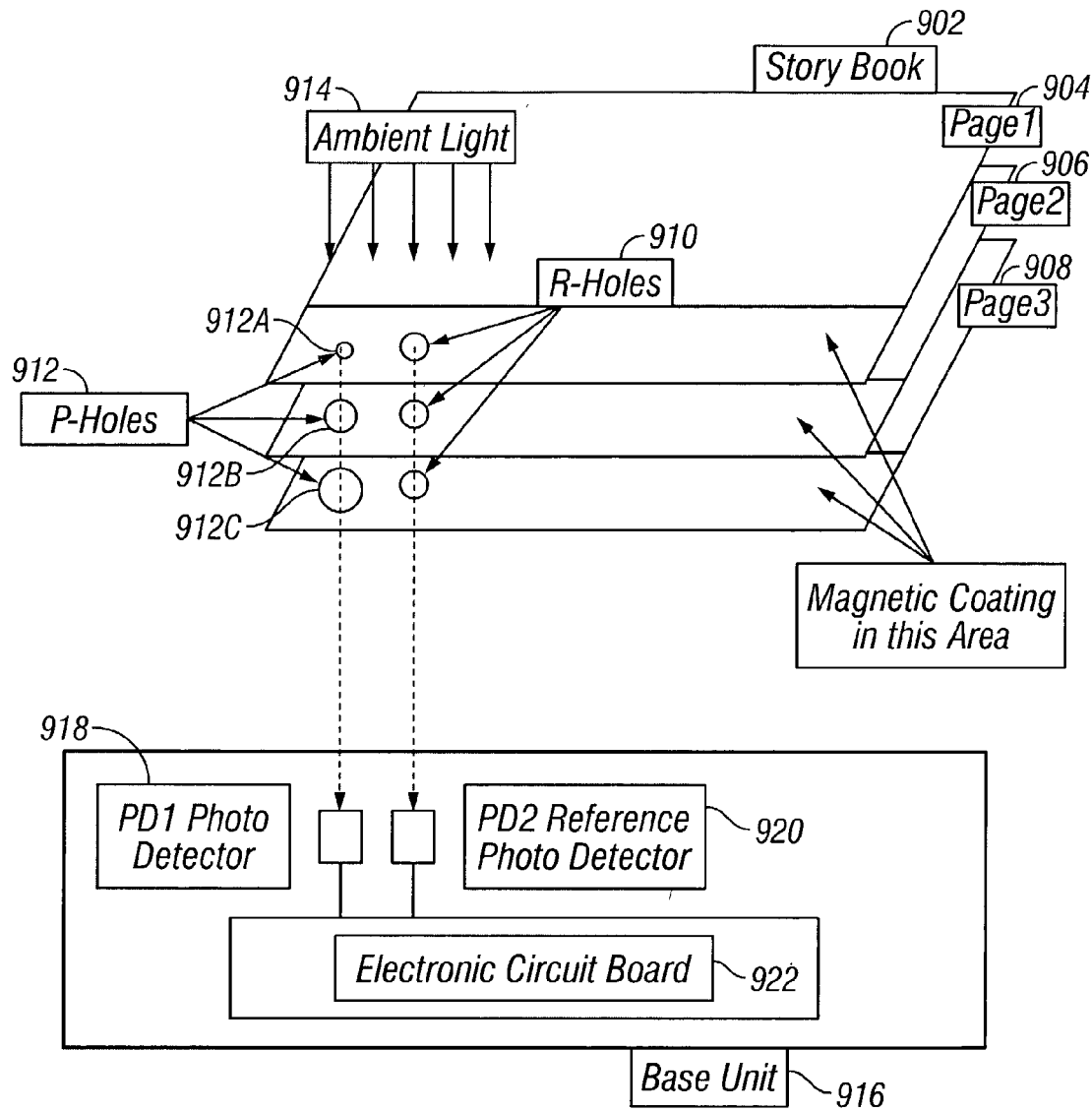
FIG. 9 shows a page detection embodiment using reference holes and progressive holes.

Another embodiment of the present invention comprises page detection using photo sensors. FIG. 9 shows an example implementation of this innovative system. The book 902 includes pages 904, 906, 908 each of which has holes 910, 912 placed therein. In a preferred embodiment, the holes are placed near the binding of the book.

Each page has a reference hole 910 and a progressive hole 912. The reference holes 910 are all the same diameter, while the progressive holes 912A, 912B, 912C increase in size as more pages are turned. The pages have magnetic coating near the holes to keep the pages intact.

Photo detectors 918, 920 are positioned to detect light passing through the progressive holes and reference holes, respectively. The photo detectors are connected to a circuit board 922 that allows processing of information. Photo detectors 918, 920 and circuit board 922 are preferably part of book holder or base unit 916.

As each page is turned during use of the system, the size of reference holes 910 remains the same, while the size of the progressive holes 912 gets bigger with each page. Hence, photo detector 920 will detect a uniform amount of light no matter what page is viewed by the user, while photo detector 918 receives increasing amounts of light with each page turned. In a preferred embodiment, photo detector 918 will experience a minimum amount of light at the first page and a maximum amount of light at the last page, with step-wise increments of light in between with each turning of a page.

Figure 10:
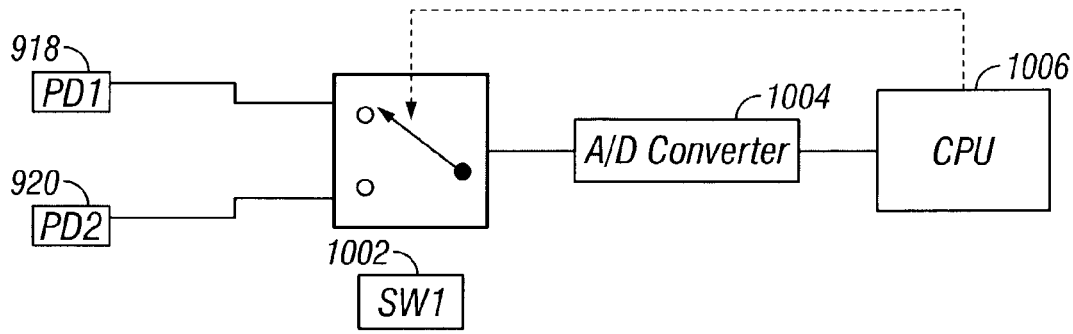
FIG. 10 shows a block diagram of the innovative system.

FIG. 10 shows a detail of the electronics used in a preferred embodiment. Detectors 918, 920 are connected to switch 1002 which is controlled by CPU 1006. The switch toggles back and forth so as to continually monitor the light received by both photo detectors 918, 920. Detectors 918, 920 convert light into analog voltage output, which is converted to a digital signal by A/D converter 1004. The digital signal from A/D converter 1004 is fed to the CPU 1006. The CPU 1006 analyzes the data of each page to determine what page is currently open. In a preferred embodiment, it does this by referring to a predetermined weight code table.

Another embodiment of the present innovations includes using resistance to detect what page a reader is on. FIGS. 11, 12, 13, and 14 show this embodiment.

Figure 11:
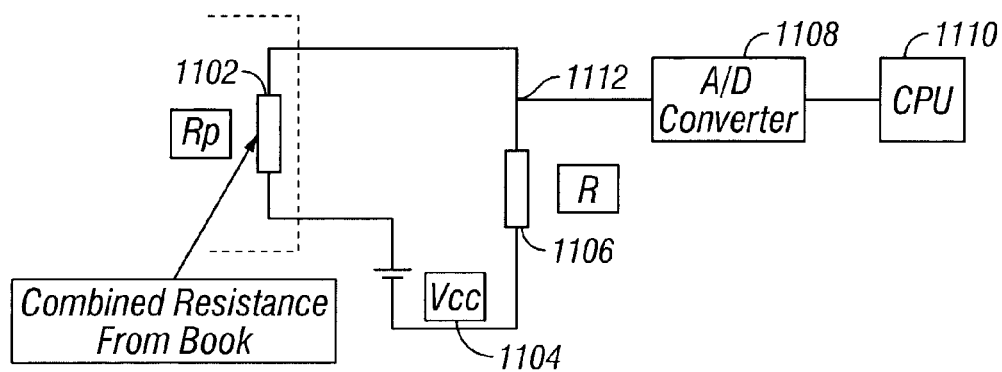
FIG. 11 shows an innovative page detection scheme relying on parallel resistors.

FIG. 11 shows a block diagram of the innovative page detection system. The pages of the book include conductive tape or paint along with resistors, so that when the pages are closed the resistances of all the pages are combined in parallel. This is represented as Rp 1102 in FIG. 11. Each page has a finite resistance, which is preferably made by using a chip resistor or resistive paint applied to the pages. Since all the pages are electrically connected, the voltage at the output terminal or node 1112 is the total parallel resistances of the combined pages. Pages which have already been opened do not contribute to this total, so that once a page has been turned, the total resistance changes in a detectable way. The page is then determined by comparing the measured total resistance with a predetermined weight code table.

The resistors in parallel 1102 are connected to a voltage source 1104 and another resistor 1106. Output node 1112 serves as a point at which to measure the resistance of the circuit. The voltage at this point 1112 is compared to the table, which includes voltage values corresponding to the known resistances for any given page position of the book. In a preferred embodiment, maximum voltage is produced at the output terminal 1112 on the first page and minimum voltage is produced on the last page.

The analog output voltage is preferably converted to a digital signal by analog-to-digital converter 1108 before being analyzed by CPU 1110.

Figure 12:
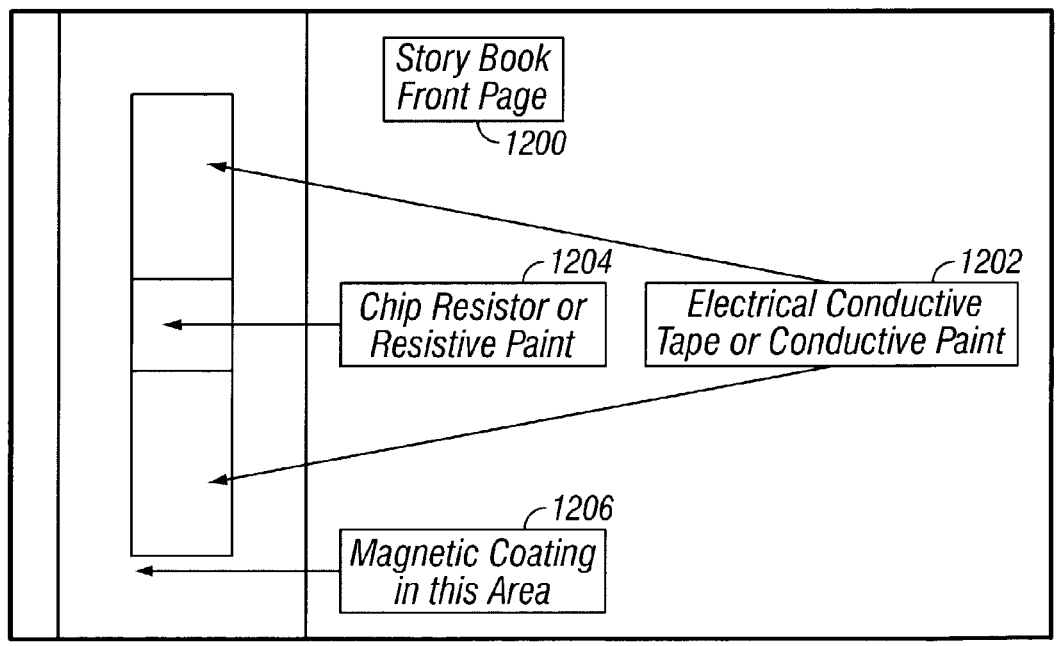
FIG. 12 shows one arrangement according to a preferred embodiment.

FIG. 12 shows the front of a typical page of a book consistent with a preferred embodiment. The front of a page 1200 includes two sections of electrical conductive tape or conductive paint 1202 separated by a resistor 1204 of some description, preferably resistive paint or a thin chip resistor. The page also has a magnetic coating 1206 to keep the pages, and their conductivity, intact. The front of each page of the book preferably includes these or analogous structures.

Figure 13:
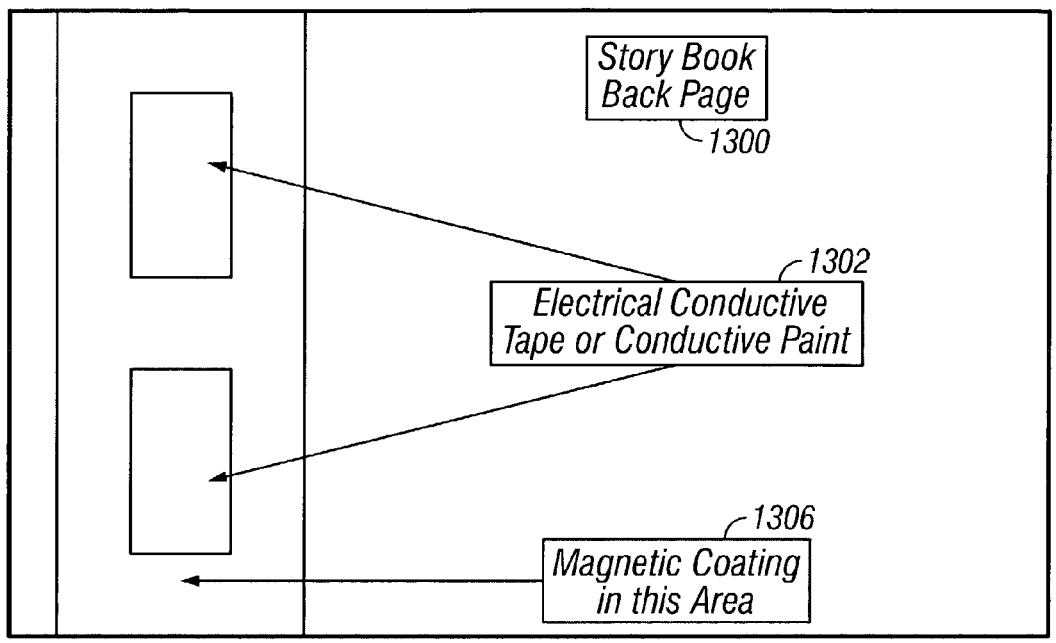
FIG. 13 shows a back page arrangement according to a preferred embodiment.

FIG. 13 shows the back of a page 1300 in a preferred embodiment of the innovative system. The page includes electrical conductive tape or paint 1302 in two sections, separated by insulation or not connected at all. The front conductive sections 1202 and the back conductive sections 1302 of a given page are preferably in contact with one another, preferably through the page itself, so that when multiple pages are closed one atop the other, the pages form a circuit that has the resistors of each page in parallel with one another. In this manner, the front conductive sections 1202 of one page contacts the back conductive sections 1302 of another page. Stacking pages thereby puts the resistors in parallel relative to voltage source 1104.

Figure 14:
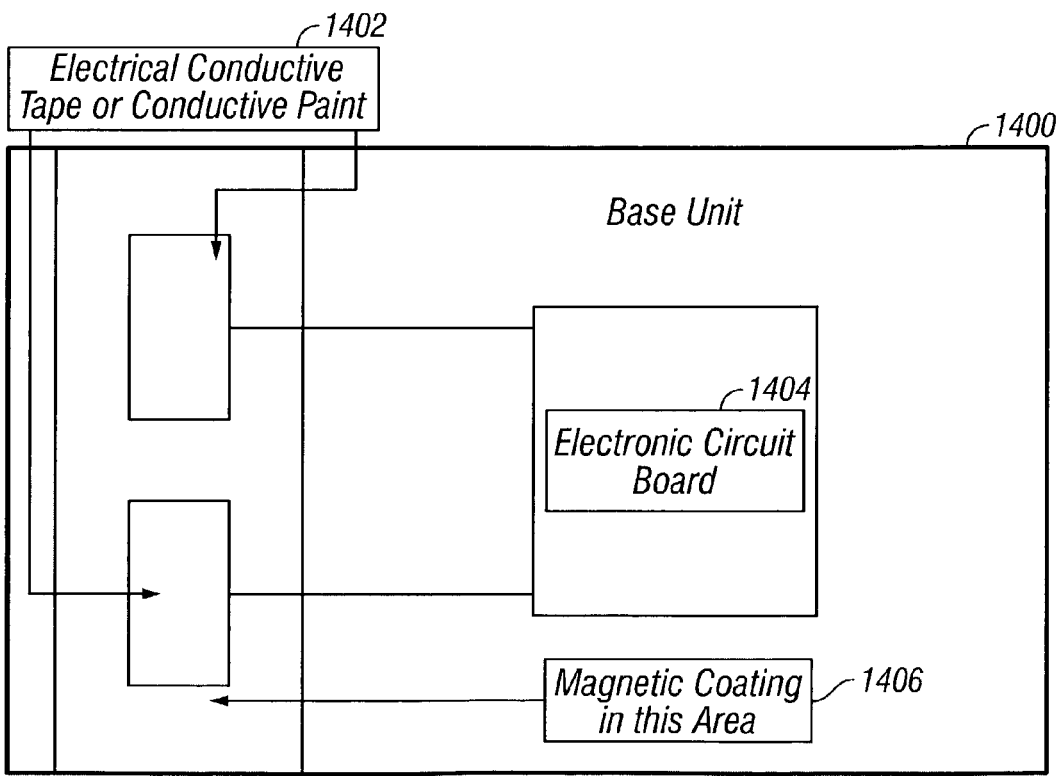
FIG. 14 shows a base unit according to a preferred embodiment.

FIG. 14 shows the base unit 1400 in which the book sits when the system is in operation. Base unit 1400 includes electrical conductive tape or paint 1402 in two separate strips, similar to the configuration for the back of each page. Each of the strips 1402 is connected to the circuit board 1404 in the base unit 1400. The strips 1402 connect the circuit board 1404 to the strips and resistors on each page such that the circuit board sees the combined resistors in parallel. With each turning of a page, the number of resistors is decreased, allowing the system to distinguish what page a user is currently viewing.

Figure 15:
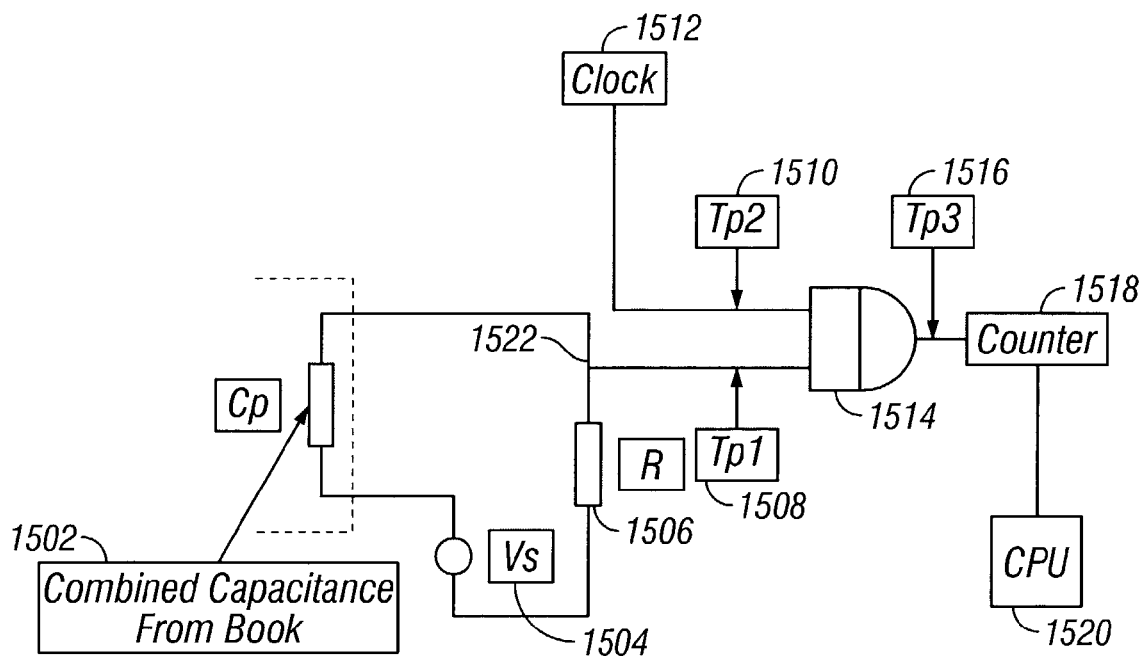
FIG. 15 shows a block diagram of a page detection scheme according to a preferred embodiment.
Figure 16:
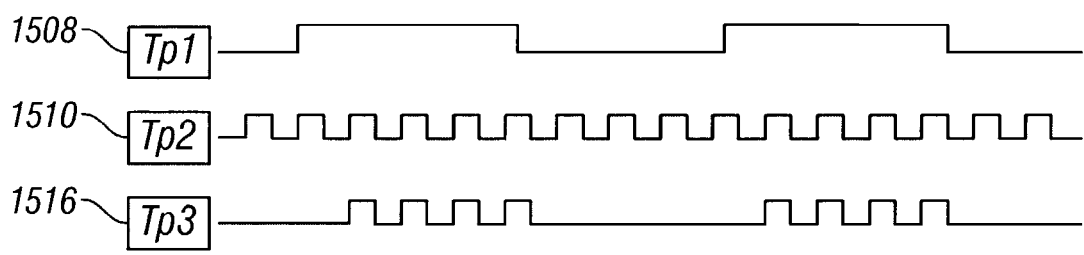
FIG. 16 shows a timing diagram of the innovative page detection scheme.

FIGS. 15 and 16 show another means to determine what page a user is currently viewing. This method includes the use of capacitors rather than resistors in a similar configuration as that shown in FIGS. 11–14. The pages are equipped as they are shown in FIGS. 12, 13, and 14, except that capacitors are used in place of resistors on the front of each page, so that the closed book comprises capacitors in parallel and connected to the circuit board in the book holder or base unit. FIG. 15 shows the innovative system having capacitors in parallel 1502 connected to an AC voltage source 1504 and a resistor 1506. Node 1522 serves as an output point for the voltage of the circuit.

Placing capacitors in parallel increases total capacitance, and hence, it increases the pulse width measured at node 1522. This pulse width is fed into an AND gate 1514. The AND gate has two inputs, including that from node 1522 and another reference input 1510 which depends on clock 1512. The pulse width generated by clock 1512 preferably produces pulse widths that are on a scale with the narrowest pulse widths liable to be produced by the combined capacitors 1502. The AND gate 1514 outputs a resulting pulse 1516 which is fed into counter 1518, and then is processed by CPU 1520. CPU 1520 compares the final measurement to a predetermined weight code table to distinguish what page the user is reading. Capacitance, and hence pulse width at node 1522, is maximum for the first page of the book and minimum for the last page in this scheme.

FIG. 16 shows a timing diagram for the pulse widths shown in FIG. 15 as 1508, 1510, and 1516. Tp3 1516 gives positive voltages when both inputs 1508, 1510 are positive. This provides a relative scale for the voltage at node 1522 so that different pages can be distinguished.

Though these embodiments have been described with reference to resistors and capacitors, the invention can also be modified to use other circuit components, such as inductors.

The particular implementation is not intended to limit the scope of the idea embodied in these examples.

Figure 17:
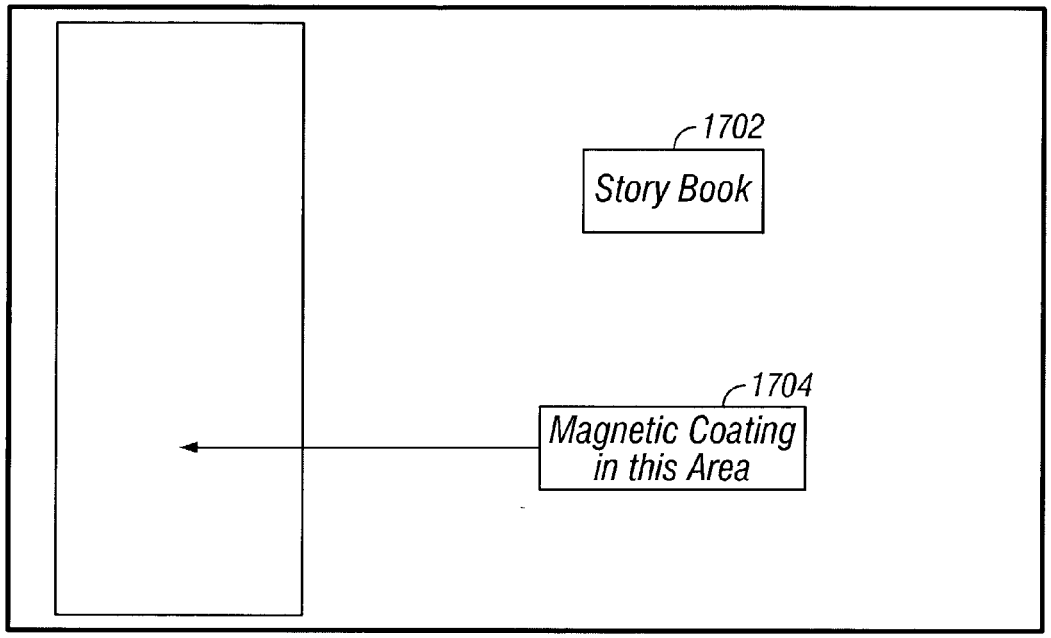
FIG. 17 shows a magnetic coating on a book page according to a preferred embodiment.
Figure 18:
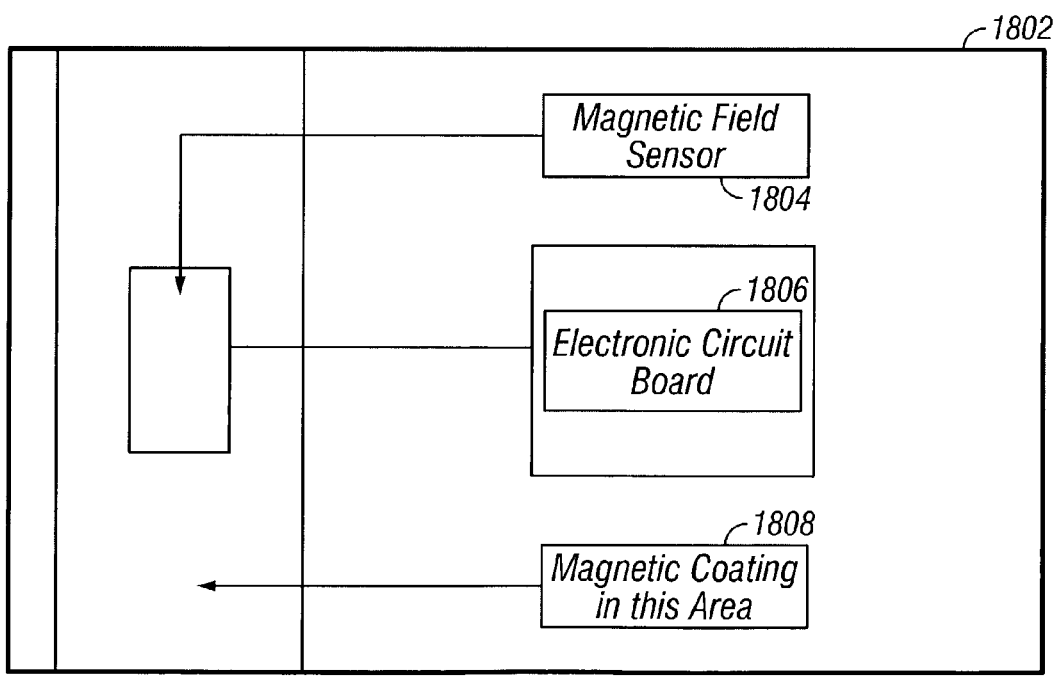
FIG. 18 shows an innovative book holder according to a preferred embodiment.
Figure 19:
FIG. 19 shows a block diagram of supporting electronics for a preferred embodiment.

FIGS. 17–19 show another embodiment of the present innovations. This system for detecting pages includes the use of magnetic strips and magnetic sensors. FIG. 17 shows a typical page in the innovative book for the system. The page 1702 includes an area (preferably near the binding) coated with a magnetic material 1704. Each page includes such a coating. The coating not only helps keep the pages intact, but also allows for accumulation of magnetic field strength caused by the coatings when the pages of the book are closed atop one another.

FIG. 18 shows the base unit 1802 of the innovative system, including magnetic coating 1808, magnetic sensors 1804 (such as Hall effect sensors) located in a position analogous to the positioning of the magnetic coatings on each of the pages, so that when the book is closed the sensor is located near or beneath the coatings of the pages. The sensor 1804 is connected to the electronic circuit board 1806. The magnetic sensor 1804 detects a magnetic field of strength depending on the number of pages which are closed—i.e., which are positioned atop the sensor. The stacked pages accumulate magnetic field strength as seen by the sensor, so that the field strength is maximum at the first page and minimum at the last page. By comparing the magnetic field strength seen by the sensor 1804, the page to which the book is opened is determined.

FIG. 19 shows a block diagram of the magnetic field sensor 1902, an analog-to-digital converter 1904, and CPU 1906. The sensor 1902 passes analog information about the magnetic field strength of the combined closed pages of the book to the A/D converter 1904, which passes the converted digital information to the CPU for processing and page determination.

Figure 20:
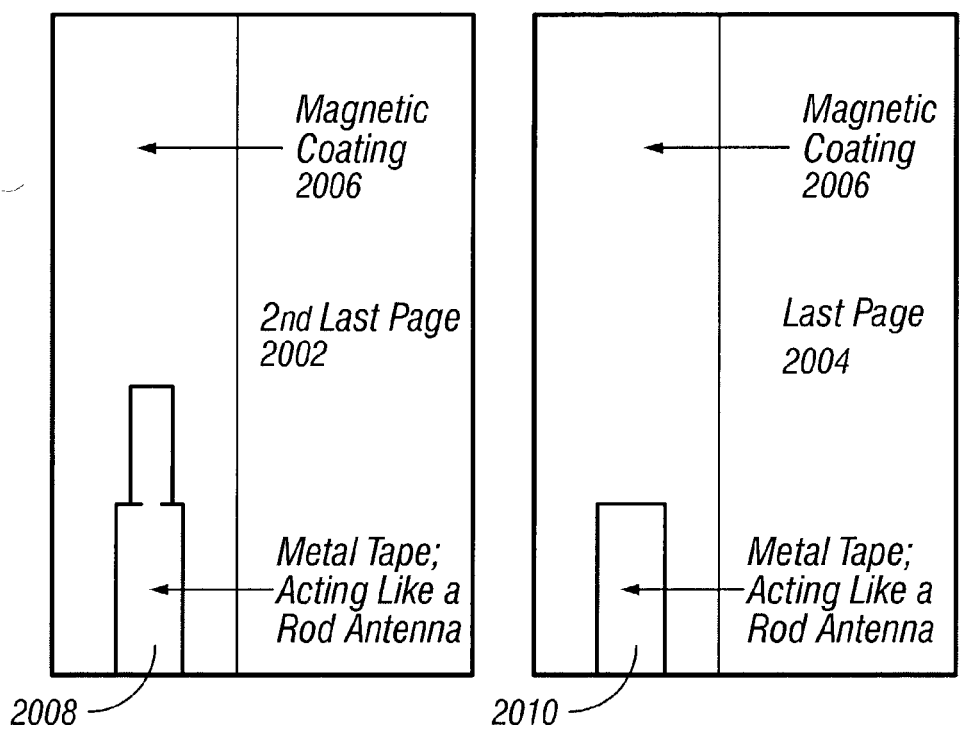
FIG. 20 shows a diagram of two pages according to a preferred embodiment which includes antennae.
Figure 21:
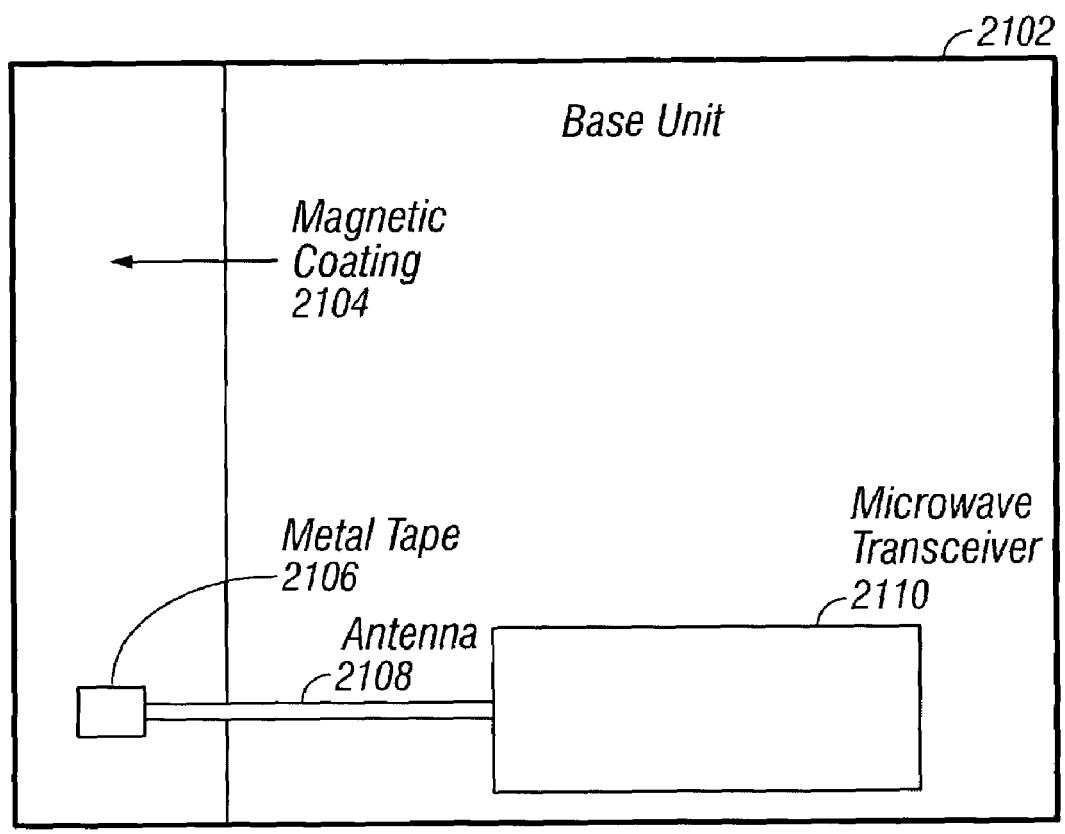
FIG. 21 shows an innovative base unit according to a preferred embodiment, including a microwave transceiver.

FIGS. 20 and 21 depict another embodiment of the present innovations. This embodiment relies on reflection of microwaves or other appropriate electromagnetic energy to determine what page a user currently views.

In FIG. 20, the second to last page 2002 and the last page 2004 are shown side-by-side. The images of the pages are truncated. Magnetic coating 2006 is applied to each page, preferably near the binding. On the last page 2004 is positioned a metal tape or other structure 2010 with the qualities of being electrically conductive and capable of reflecting electromagnetic energy. Second-to-last page 2002 includes a metal tape or similar structure 2008 positioned at an offset location relative to tape 2010 on page 2004. With both pages closed, the antenna 2008, 2010 overlap to form a single antenna which reflects a greater amount of microwaves emitted from transceiver (shown in FIG. 21). Hence, as each page is closed, the effective antenna length, and microwave reflectivity, is enhanced. The reflectivity is at maximum with all pages closed, and at minimum when only the last page remains. In a preferred embodiment, the antennae 2008, 2010 are each individual segments of roughly equal length, though other embodiments include progressively longer segments, each extending farther than the antenna segment on the page after it. The antenna segments are preferably electrically connected.

FIG. 21 shows the base unit 2102 with magnetic strip 2104, along with metal tape 2106 attached to antenna 2108. Antenna 2108 emits microwave radiation generated by microwave transceiver 2110 and receives reflected radiation from the antennae located on the pages above the base unit. The antennae of the pages will reflect more or less radiation depending on the size of the antenna, and hence the number of pages which are overlaid. By distinguishing the differences in reflected microwave radiation, the current page being viewed can be determined. Note that though this embodiment is described with respect to microwave radiation, other types of electromagnetic energy can also be used, provided the energy is of a wavelength and character such that the pages themselves are relatively transparent and such that the energy can be reflected by antennae attached to the pages.

Figure 22A:
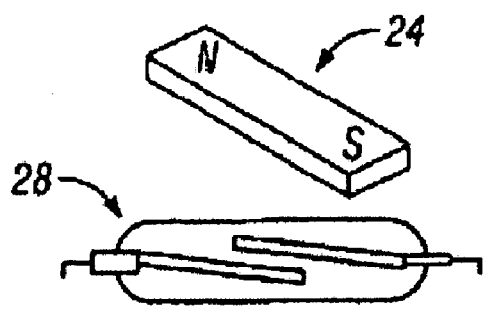
FIGS. 22a–22c are magnetic signatures which may be implemented in the preferred embodiment of the present invention.
Figure 22B:
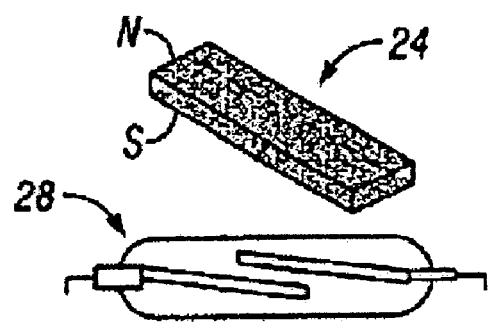
Figure 22C:
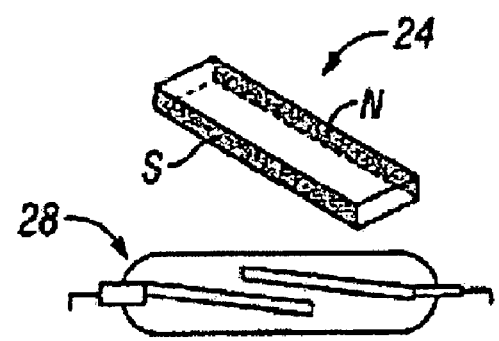

With reference to FIGS. 22a–22c, therein are shown magnetic signatures which may be implemented in the preferred embodiment of the present invention. In one embodiment of the present invention, as shown in FIG. 22a, the array of magnetic signatures 24, which are attached to at least some of pages 20 of a book 404, may include magnets with polarization (e.g., N and S) on both ends of each magnet. If the magnetic signature 24 with polarizations on either end of the magnet is utilized, the magnetic wigaature sensor 26 comprising one or more individualized reading elements 28 must correspond accordingly. Other variations of magnetic signatures 24 which may be implemented in a preferred embodiment of a present invention may include magnetic signatures 24 which have polarization on the top and bottom surfaces of the magnetic signature 24 and/or magnetic signatures 24 with polarization on either side of the magnetic signature 24. Again, regardless of the array of magnetic signatures 24 which are utilized in the system 10, the magnetic signature sensor 26 must be able to detect the corresponding magnetic signature 24 via the reading elements 28.

I claim:

1. A system for playing audio with text, comprising:
   an electronic book holder that accepts a cartridge, the cartridge including content associated with a plurality of books;
   a book having a plurality of positions, at least some of the positions having indicators which are detectable by the holder,
   wherein when a book is placed in the electronic book holder, the positions of the indicators are automatically read to identify the book and to associate the book with content from the cartridge associated with the book that is placed in the electronic book holder.

2. The system of claim 1, wherein said indicators are detected by the holder in a contactless manner.

3. The system of claim 1, wherein the book holder selectively plays the content such that when pages of the book are in a first open position, content associated with a first page is displayed.

4. The system of claim 1, wherein said book holder includes a plurality of switches, each of said switches being operable to close as a result of the presence of one of said indicators.

5. The system of claim 4, wherein said switches are magnetic switches.

6. The system of claim 4, wherein said indicators are magnets.

7. The system of claim 1, wherein the indicators generate magnetic fields that are detectable by the book holder.

8. The system of claim 1, wherein each page of the book has a single indicator affixed thereto such that when a page is turned, the indicator associated with that page is not detectable by the book holder.

9. A system for playing audio with text, comprising:
   a book holder system adapted to play audio through a speaker, the book holder system receiving a cartridge, the cartridge including content associated with a plurality of books;
   a book having a binding defining a first plurality of locations and a second plurality of locations;
   wherein the book holder system automatically identifies the book when placed in the book holder system by using said first plurality of locations.

10. The system of claim 9, wherein the content is retrieved from the cartridge based on the identity of the book.

11. The system of claim 9, wherein the binding is a spiral binding passing through holes in the book and wherein the first plurality of locations comprises the bottom three spaces between the holes of the spiral binding.

12. The system of claim 9, wherein the second plurality of positions is equal to the number of open positions of the book.

13. A system for playing audio with text, comprising:
    a book holder designed to receive a book, the book having a plurality of pages;
    magnetic material attached to each of the plurality of pages such that when pages of the plurality are overlaid, the strength of a resulting magnetic field increases;
    wherein the book holder includes a magnetic field sensor positioned to detect the resulting magnetic field.

14. The system of claim 13, wherein the page of the book being viewed by a user is indicated by the relative strength of the resulting magnetic field.

15. A system for playing audio with text, comprising:
    an electronic book holder that receives a book and a cartridge containing content associated with a plurality of books;
    magnetic material attached to the book in discrete locations;
    wherein the book holder includes a plurality of magnetic switches aligned with said discrete locations such that when said book is received within said book holder, said magnetic material overlays said magnetic switches at the respective discrete locations to automatically move at least one of plurality of magnetic switches to identify the book, such that content associated with the book may be retrieved from the cartridge.

16. The system of claim 15, further comprising a processor, wherein said processor selects audio to be played in accordance with the arrangement of moved switches.

17. The system of claim 15, wherein movement of said switch closes said switch.

* * * * *

UNITED STATES PATENT AND TRADEMARK OFFICE
CERTIFICATE OF CORRECTION

PATENT NO.         : 7,111,774 B2  
APPLICATION NO. : 10/272062  
DATED                 : September 26, 2006  
INVENTOR(S)       : Jin Song It is certified that error appears in the above-identified patent and that said Letters Patent is hereby corrected as shown below:

Col. 1, line 67, "know" should read--knows--.  
Col. 10, line 58, "wigaature" should read--signature--.  
Col. 12, line 36, "of plurality" should read-- of said plurality--.

Signed and Sealed this

Fifth Day of June, 2007

JON W. DUDAS  
*Director of the United States Patent and Trademark Office*

UNITED STATES PATENT AND TRADEMARK OFFICE
Certificate

Patent No. 7,111,774 B2                                   Patented: September 26, 2006

On petition requesting issuance of a certificate for correction of inventorship pursuant to 35 U.S.C. 256, it has been found that the above identified Patent, through error and without any deceptive intent, improperly sets forth the inventorship.

Accordingly, it is hereby certified that the correct inventorship of this Patent is: Jin Song, Dallas, TX (US); and Youngmin Kim, Barrie, Ontario (CA).

Signed and Sealed this Twenty-fourth Day of July 2012.

STEVEN S. PAIK
*Supervisory Patent Examiner*
Art Unit 2887
Technology Center 2800